(12) United States Patent
Nielsen et al.

(10) Patent No.: US 7,877,704 B2
(45) Date of Patent: Jan. 25, 2011

(54) RADIO TERMINAL

(75) Inventors: Peter Dam Nielsen, Kgs. Lyngby (DK); Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 1397 days.

(21) Appl. No.: 09/833,607

(22) Filed: Apr. 13, 2001

(65) Prior Publication Data

US 2001/0030663 A1 Oct. 18, 2001

(30) Foreign Application Priority Data

Apr. 13, 2000 (GB) .................. 0009081.1

(51) Int. Cl.
*G06F 17/21* (2006.01)
*G06F 3/048* (2006.01)
*G06F 3/14* (2006.01)

(52) U.S. Cl. .................. 715/815; 715/243; 715/864

(58) Field of Classification Search .................. 345/810, 345/830, 864; 715/512, 519, 517, 529, 521, 715/531, 810, 864, 719, 747, 243, 815
See application file for complete search history.

(56) References Cited

U.S. PATENT DOCUMENTS

| 4,796,008 | A | * | 1/1989 | Haneda ................... 345/172 |
| 5,761,610 | A | * | 6/1998 | Sorensen et al. ............. 455/558 |
| 6,138,039 | A | * | 10/2000 | Sudo et al. .................. 455/566 |
| 6,147,670 | A | * | 11/2000 | Rossmann .................. 345/685 |
| 6,209,009 | B1 | * | 3/2001 | Schwartz et al. ............ 715/517 |
| 6,366,302 | B1 | * | 4/2002 | Crosby et al. ............... 715/786 |
| 6,683,626 | B1 | * | 1/2004 | Abellera ..................... 715/785 |

FOREIGN PATENT DOCUMENTS

| EP | 0698845 | 2/1996 |
| EP | 0949559 | 10/1999 |
| WO | 9822910 | 5/1998 |

OTHER PUBLICATIONS

Camarda, Bill. Using Microsoft Word 97. Indianapolis: Que Corporation, 1997.*
Edel, Mark et al., "NEDIT 5.0", Mar. 11, 1998, University of Toronto, pp. 32-33.*
"Release Notes for NEdit Version 5.1.1", Mar. 17, 1999, Available [Online] http://h30097.www3.hp.com/demos/ossc/doc/nedit-5.1.1/ReleaseNotes.*

(Continued)

*Primary Examiner*—Namitha Pillai
(74) *Attorney, Agent, or Firm*—Alston & Bird LLP

(57) ABSTRACT

A method and terminal for displaying information on a display, where the information is provided with elements. An element is either having a continuous length presenting a length which is equal to or greater than the size of said display, or a wrapped length presenting a length which is less than the size of said display. The display is further provided with a user interface having a menu structure of items. The user interface is provided with a selectable continuous length item and a wrapped length item. The information is displayed according to the selection made in the menu structure of the user interface, in order to allow the user to toggle between continuous length and wrapped length.

21 Claims, 4 Drawing Sheets

OTHER PUBLICATIONS

WAP Architecture, Version Apr. 30, 1998, Wireless Application Protocol Architecture Specification, pp. 1-20.

Office Action for EP Application No. 01 302 183.7 dated Dec. 30, 2009.

"Microsoft Excel, Introdocutory Course, Course Notes, p. 1-60" [Online] Apr. 1, 2009, , XP007908020 Microsoft Excel 1997 Introductory Course Course Notes, 60 pages, Retrieved from the Internet: URL:http://www.richmond.ac.uk/downloads/it av/training/ 97INTRXL.pdf > [retrieved on Apr. 1, 2009].

"Microsoft Excel 97 - word wrap function" 1997, MICROSOFT, XP007908175, 4 pages.

* cited by examiner

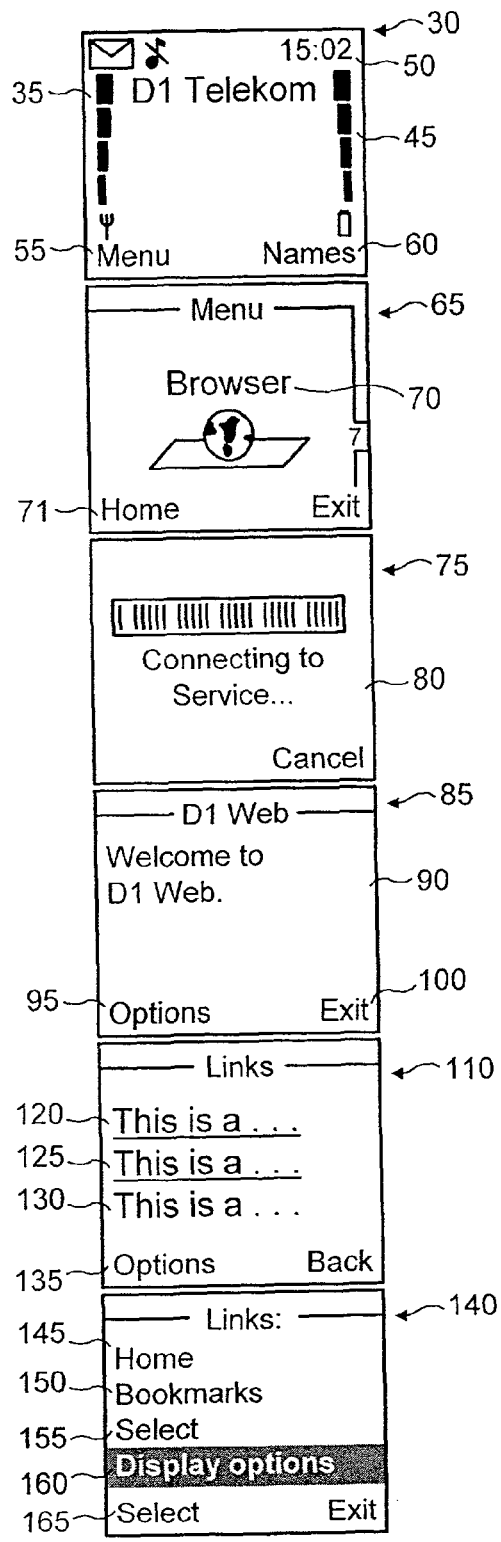

RADIO TERMINAL

BACKGROUND OF THE INVENTION

1. Field of the Invention

The present invention relates to a terminal and a method thereto for displaying information on a small display.

2. Description of the Prior Art

Some handheld devices, such as personal digital assistants (PDA), cellular phones, pagers as well as desk-top telephones, are capable of receiving and displaying different kind of information. This information is typically elements comprising a text based on alpha-numerical signs, but the elements can also comprise graphics. However, these types of devices use a display of rather small size, which some users may experience as difficult to monitor. The difficulty lays often in how the information is presented on the display, which might differ depending on the information provider and/or the device itself.

One way of displaying the information would be to wrap text and feed it vertically down the display, which might be preferable if the text is longer than the width of the display. If the text is longer than what can be continued in the number of lines displayable in the display, the text is clipped vertically, causing the remaining text to be accessable by scrolling the text downwards. The scrolling could either be done manually, for example, by pressing on a pre-defined key which activates the scrolling function, or automatically.

Another way of displaying information could be to display text which is continuous, that is text which is shown on a single line. If the text is longer than the width of the display, the text can be scrolled across the display either manually, for example, by pressing on a pre-defined key which activates the scrolling function, or automatically.

Also, these two ways of displaying, can be combined dynamically by the provider and/or the manufacturer. Thus, if some parts are considered as easier to monitor when displayed in one way, and vice versa, then the provider and/or the manufacturer can display the information in the preferred way. For example, the elements can be links displayed in a list, which can be scrolled down vertically. In order to do this quickly, it might be preferable to display the list as continuous text. However, if the elements are initially showing the same content on the display, and the remaining parts are not visible, then it might be preferred to wrap the text.

Here is an example of three elements to be displayed:

http://wap.nokia.com/club.wml http://wap.nokia.com/stock.wml http://wap.nokia.com/net.wml Here is an example of how these three elements can be displayed as continuous text, which initially showing the same content on the display:

http://wap.nokia.com/ . . .

http://wap.nokia.com/ . . .

http://wap.nokia.com/ . . .

Here is another example of how these three elements can be displayed as wrapped text:

http://wap.nokia.com/club.wml http://wap.nokia.com/stock.wml http://wap.nokia.com/net.wml Both of these two alternatives can be useful depending on what the user would like to do. However, there are very few possibilities for the user to affect the elements. Therefore, there is a need to improve and facilitate the possibilities to display the information on a display.

SUMMARY OF THE INVENTION

According to one aspect of the present invention there is provided a method for displaying information on a display, where the information is provided with elements. An element is either having a continuous length presenting a length which is equal to or greater than the size of said display, or a wrapped length presenting a length which is less than the size of said display. The display is further provided with a user interface having a menu structure of items. The user interface is provided with a selectable continuous length item and/or a wrapped length item. The information is displayed according to the selection made in the menu structure of the user interface, in order to allow the user to toggle between continuous length and wrapped length.

According to another aspect of the present invention there is provided a terminal for displaying information on a display. The information comprising elements, wherein an element is either provided with a continuous length presenting a length which is equal to or greater than the size of the display, or a wrapped length presenting a length which is less than the size of the display. The terminal comprises a display for displaying the information, and a user interface provided with a menu structure comprising a selectable continuous length item and/or a wrapped length item. The items are arranged to display the information according to a selection made in the menu structure, in order to allow the user to toggle between continuous length and wrapped length.

According to a third aspect of the present invention there is provided a terminal for displaying information on a display. The information comprising elements, wherein an element is either provided with a continuous length presenting a length which is equal to or greater than the size of the display, or a wrapped length presenting a length which is less than the size of the display. The terminal comprises a display for displaying the information, means for setting a first type of elements to be displayed as a continuous length item and a second type of element to be displayed as a wrapped length item. Also, the terminal comprises means for identifying the first type of element when acting in a text to be displayed, and means for displaying the first and second type of elements according to their setting.

BRIEF DESCRIPTION OF THE DRAWINGS

For a better understanding of the present invention and to understand how the same may be brought into effect reference will now be made by way of example only to the accompanying drawings in which.

DETAILED DESCRIPTION OF THE INVENTION

Figure 1:
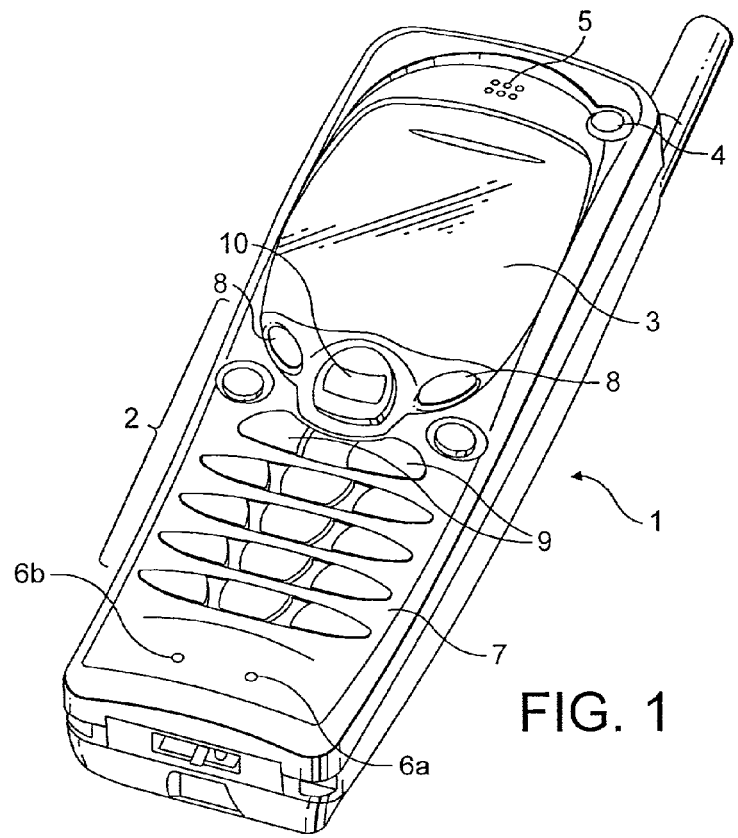
FIGS. 1 and 2 schematically illustrate a radio handset.

FIG. 1 shows a preferred embodiment of a terminal, hereafter also referred as a phone, according to a preferred embodiment of the invention. The phone, which is generally designated by 1, comprises a user interface having a keypad 2, a display 3, an on/off button 4, a speaker 5, a microphone 6*a* and a transducer 6*b*. The phone 1 according to the preferred embodiment is adapted for communication via a wireless telecommunication network, for example a cellular network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0-9" or a sign "#" or "*", respectively. In alpha mode each key is associated with a number of letters and special signs used in text editing.

The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb. Since many experienced phone users are used to one-hand control, it is a very good solution to place an input key, requiring precise motor movements. Thus, the user may place the phone in the hand between the finger tips and the palm of the hand. Hereby, the thumb is free for inputting information.

The transducer 6b could be a buzzer, and is arranged to generate a sound of a ring tone, upon reception of a signal from another phone, e.g. an incoming call or reception of an SMS (short messaging service) message.

Figure 2:
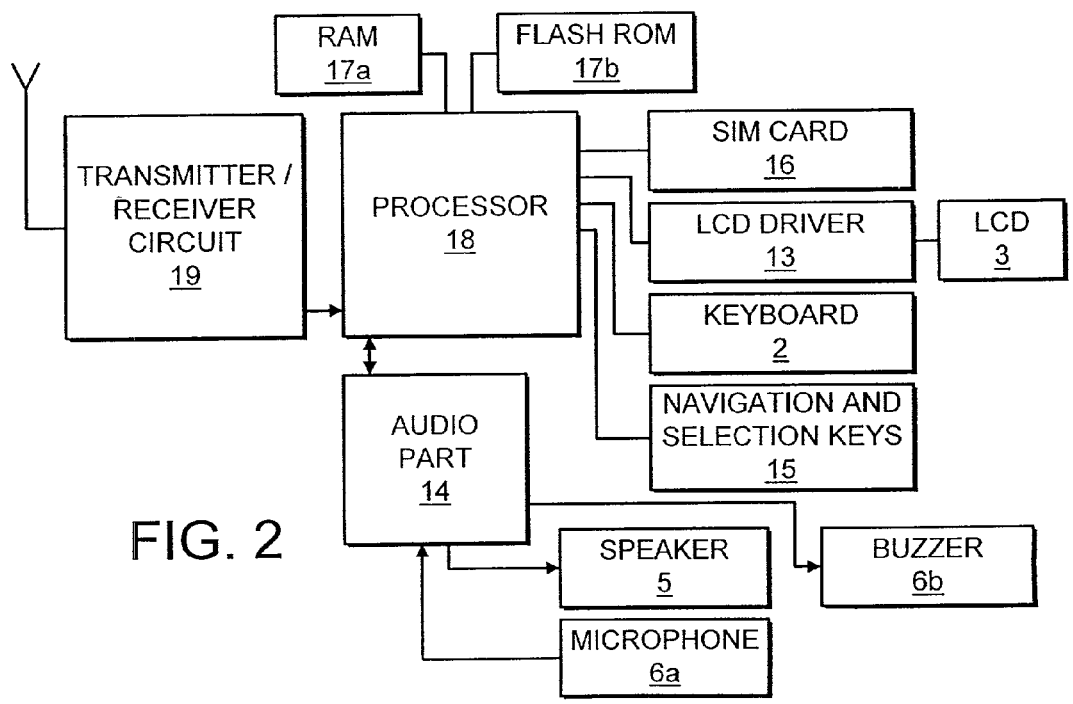

FIG. 2 schematically shows the most essential parts of a preferred embodiment of the phone. These parts being essential to understand the invention. The preferred embodiment of the phone of the invention is adapted for use in connection with a GSM network, but, of course, the invention may also be applied in connection with other phone networks, such as other kinds of cellular networks and various forms of cordless phone systems or in dual band phones accessing sets of these systems/networks. The microphone 6a records the user's speech, and the analog signals formed thereby are A/D converted in an A/D converter (not shown) before the speech is encoded in an audio part 14. The encoded speech signal is transferred to controller means 18, which may support software in the phone. The controller means 18 also forms the interface to the peripheral units of the apparatus, including a RAM memory 17a and a Flash ROM memory 17b, a SIM card 16, the display 3 and the keypad 2 (as well as data, power supply, etc.). The controller means 18 communicates with the transmitter/receiver circuit 19. The audio part 14 speech-decodes the signal, which is transferred from the controller 18 to the earpiece 5 via a D/A converter (not shown).

Also, the audio part 14 is also able to give an output of an ring tone to the buzzer 6b. The ring tone can be stored in either of the memories 17a,b, and is recalled when the receiver 19 receives an incoming signal, by means of the controller 18. Thus, the ring tone is recalled from the memory, forwarded to the audio part 14, and the ring tone is generated as an output from the buzzer 6b.

The controller means 18 is connected to the user interface. Thus, it is the controller means 18 which monitors the activity in the phone and controls the display 3 in response thereto.

Therefore, it is the controller means 18 which detects the occurrence of a state change event and changes the state of the phone and thus the display text. A state change event may be caused by the user when activating the keypad including the navigation key 10, and these types of events are called entry events or user events. However, the network communicating with the phone may also cause a state change event. This type of event and other events beyond the user's control are called non user events. Non user events comprise status change during call set-up, change in battery voltage, change in antenna conditions, message on reception of SMS, etc.

Figure 3:
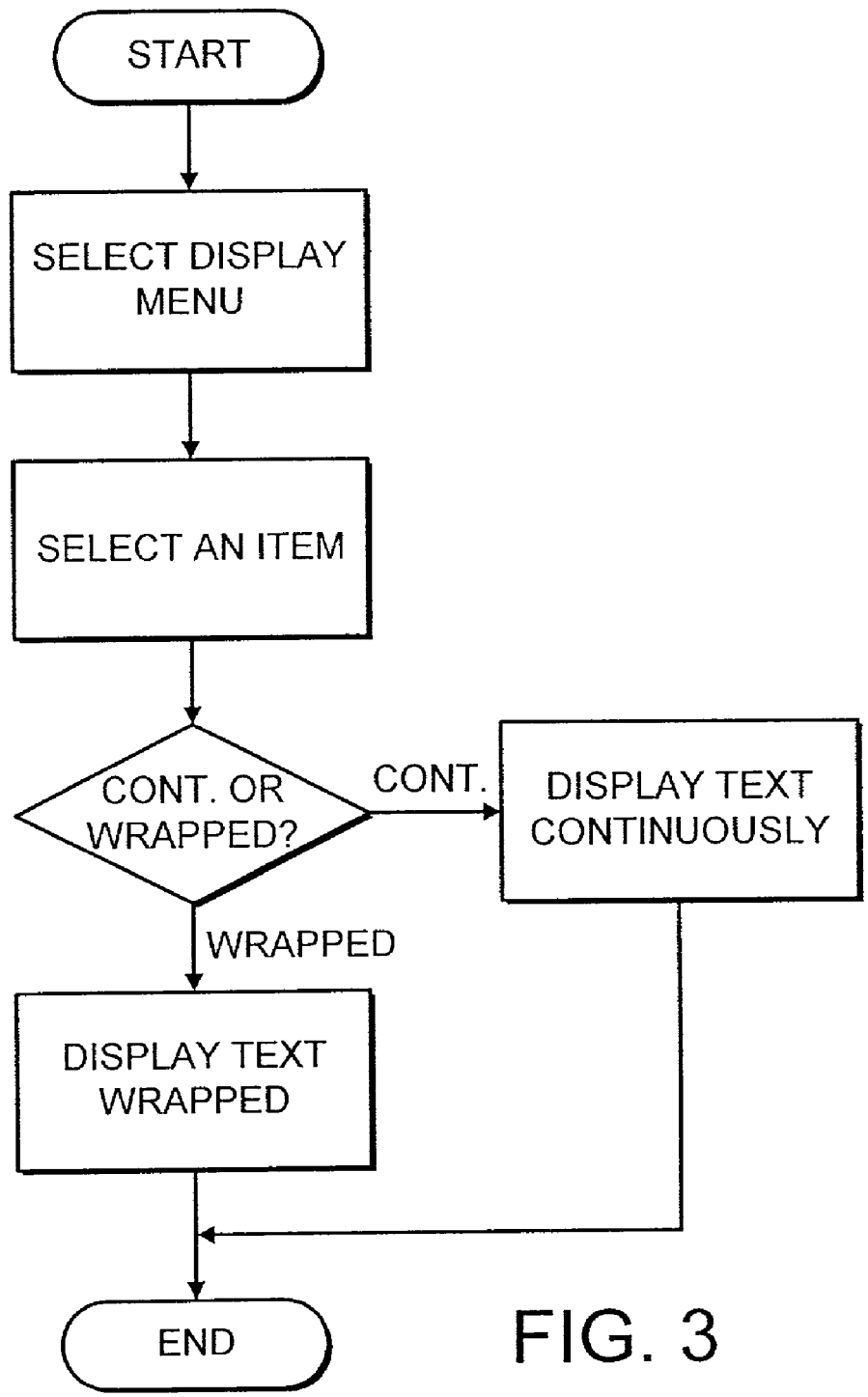
FIG. 3 is a flowchart illustrating one aspect of the present invention.

FIG. 3 shows a flowchart over a method for displaying information on a display, in accordance with the present invention. The information is provided with elements. An element is either having a continuous length presenting a length which is equal to or greater than the size of the display, or a wrapped length presenting a length which is less than the size of said display. The display is further provided with a user interface having a menu structure of items.

In order to allow the user to toggle between continuous length and wrapped length, the user is first able to select a display menu "SELECT DISPLAY MENU". In this menu, the user interface is provided with a selectable continuous length item and/or a wrapped length item "SELECT AN ITEM". If the present text is set as wrapped text, and the user would like to change it into continuous text, the user would perhaps like to choose the continuous length item, "CONT. OR WRAPPED?". Thereafter, the information is finally displayed according to the selection made in the menu structure of the user interface, which in this case was "DISPLAY TEXT CONTINUOSLY".

As an alternative solution, in accordance with the present invention, the selection could be done automatically. This is done by providing the terminal with means for setting a first type of elements to be displayed as a continuous length item and a second type of element to be displayed as a wrapped length item. The terminal also comprises means for identifying the first type of element when acting in a text to be displayed, and means for displaying the first and second type of elements according to their setting.

Figure 4B:
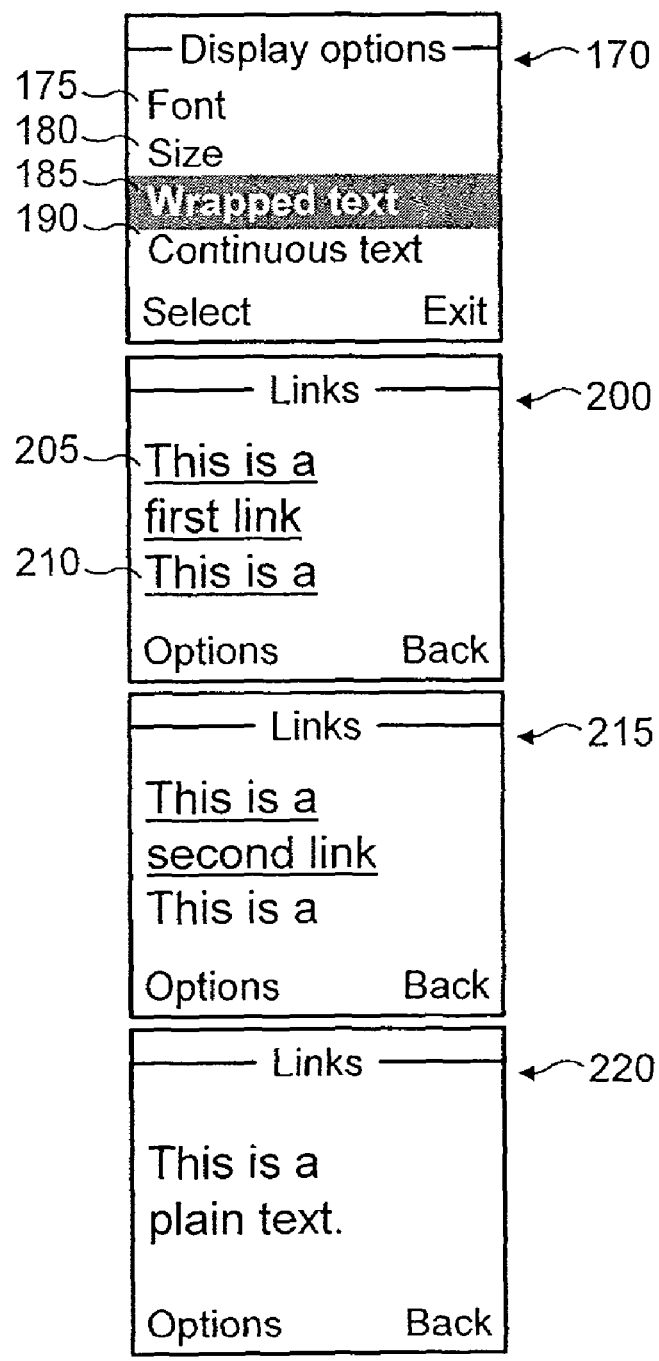
FIG. 4 illustrates a user interface according to an embodiment of the present invention.

With reference to FIGS. 4a and 4b, an example is shown on how the display in a user interface can act by interaction of the user according to the present invention. The user interface may comprise the same elements as shown in FIG. 1, i.e. a keypad 2, a display 3, an on/off button 4, a speaker 5 and a microphone 6. Also, it is the control means 18 in FIG. 2 which controls the user interface. Starting from FIG. 4a, there is a layout 30 presented on a display in a phone, as shown in FIGS. 1 and 2, which indicates signal strength 35 from the wireless telecommunication network "D1 Telekom" 40, the battery power 45 and a clock showing the time 50 in hours and minutes. Preferably, the display in the phone is an LCD (Liquid Crystal Display) display. The display, can be controlled by the control means 18 as shown in FIG. 2. The layout 30 presents an example of the phone in idle mode, i.e. when the phone is activated and awaiting an action, for example an incoming or outgoing call. In the bottom of the display there are two items which are denoted as "Menu" 55 and "Names" 60. If the user selects "Names" 60 he/she can, for example, access a built in phone book. If the user selects "Menu" 55, he/she can select among several different menus. The actual selection of features in the bottom of the display, like "Menu" and "Names", can be selected by means of the soft keys disclosed with reference to FIG. 1.

One of the menus can be the next layout 65 called "Browser" 70. If the user chooses to use this menu, he/she can access different telecom related information services, for example Internet. One way of accessing this kind of information is to use the Wireless Application Protocol, WAP. The Wireless Application Protocol (WAP) is a result of continuous work to define an industry wide standard for developing applications over wireless communication networks. WAP is disclosed in the Wireless Application Protocol Architecture Specification; Version 30 Apr. 1998; by Wireless Application Protocol Architecture Working Group.

If the user chooses to select "Home" 71, this may lead to the next layout 75, which graphically indicates, "Connecting to Service" 80. This shows an example of how the phone is trying to establish a connection to, for example Internet, by sending an access request to a server. If a connection is established, some kind of welcome text for a home page might be displayed, "Welcome to D1 Web." 90. If the user selects "Options" 100 a list of selections can be displayed as shown in the following layout 110. For example, the different choices could be different links or just plain text, wherein a link is indicated by the underline "This is a . . ." 120, 125 and a plain text have no underlining "This is a . . ." 130. The dots " . . . " indicates that not all the text is visible, and is an example of continuous text. The text is typically alpha-numerical.

In this example the user selects to continue with pressing on the softkey as is indicated as Options 135, which brings the next layout 140. This layout shows a menu structure of items; "Home" 145, "Bookmarks" 150, "Select" 155 and "Display options" 160. The text which is inverted in "Display options" 160 is selected by 165, which brings FIG. 4*b* and the layout for Display options 170. In this layout the user has the following choices: Font 175, Size 180, Wrapped text 185 and Continuous text 190. In accordance with the present invention, the user is allowed to toggle between the continuous length (as shown in layout 110) and wrapped length, by providing a selectable item of either "Wrapped text" 185 or "Continuous text" 190. Other items are also shown in this layout, like Font 175 and Size 180, which gives the user further choices to adopt the text in a preferred manner. Since the information displayed in layout 110 is continuous and not all information is visible, the user chooses in this example to select Wrapped text 185.

By selecting Wrapped text, the text in layout 110 is changed to be displayed like the text in layout 200. Now, the user is able to read the whole text of the first text "This is a first link" 205 and a part of the second text "This is a" 210. When the user scrolls down the text in the display, by using navigation key 10 (FIG. 1), the remaining text from layout 110 is now visible from layout 215 and 220.

Although the invention has been described with respect to a particularly preferred embodiment, it should be appreciated that the invention as defined by the claims extends beyond the particular features of the embodiment described to encompass modifications and variations to the embodiment not necessarily described.

The invention claimed is:

1. A method for displaying information on a mobile terminal display via a browser, said information including elements, wherein an element is one of a continuous length element presenting a length which is equal to or greater than a horizontal size of the mobile terminal display, and a wrapped length element presenting a horizontal length which is less than the horizontal size of the mobile terminal display, and the mobile terminal display is further provided with a user interface including a displayed menu structure of items displayed on the mobile terminal display, said method comprising the following steps:

providing in said displayed menu structure a selectable continuous length item and a wrapped length item which are chosen from the mobile terminal display as display options;

selecting one of said continuous length item and said wrapped length item in the displayed menu structure of the user interface; and displaying said information according to the selection of the display option made in the menu structure of the user interface, in order to allow a user to toggle between the continuous length item and the wrapped length item, wherein selection of the continuous length item causes the element to be displayed as the continuous length element on a single line of the mobile terminal display and selection of the wrapped length item causes the wrapped length element to be displayed on a plurality of lines of the mobile terminal display.

2. A method according to claim 1, wherein said information is displayed as alpha-numerical signs.

3. A method according to claim 2 wherein:

the mobile terminal display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

4. A method according to claim 1, wherein the continuous length element is arranged to be horizontally scrolled over the mobile terminal display to allow the user to view portions of the continuous length element that are not visible on the mobile terminal display due to the continuous length element extending beyond a horizontal boundary of the mobile terminal display.

5. A method according to claim 4 wherein:

the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

6. A method according to claim 1, wherein the wrapped length element is adapted to fit a size of the mobile terminal display, by splitting the wrapped length element into parts, each of the parts fitting in a size of the mobile terminal display and feeding said parts in a vertical direction over the mobile terminal display, each time a length of the wrapped length element is greater than the width of the mobile terminal display.

7. A method according to claim 6 wherein:

the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

8. A method according to claim 1 wherein:

the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

9. A mobile phone terminal for displaying information via a browser, the information comprising elements, wherein an element is one of a continuous length element and a wrapped length element, said terminal comprising:
a display for displaying said information; and
a user interface provided with a displayed menu structure displayed on said display comprising a selectable continuous length item and a wrapped length item which are chosen from the display as display options, said continuous and wrapped length items are arranged to display said information according to a selection of the display option made in the menu structure, in order to allow a user to toggle between the continuous length item and the wrapped length item,
wherein selection of the continuous length item causes the element to be displayed as the continuous length element on a single line of the display and selection of the wrapped length item causes the wrapped length element to be displayed on a plurality of lines of the display, the continuous length element presenting a length which is equal to or greater than a horizontal size of the display, and the wrapped length element presenting a horizontal length which is less than the horizontal size of the display.

10. A terminal according to claim 9, wherein said information is alpha-numerical.

11. A terminal according to claim 10 wherein:
the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

12. A terminal according to claim 9, wherein the continuous length element is arranged to be horizontally scrolled over said display to allow the user to view portions of the continuous length element that are not visible on the display due to the continuous length element extending beyond a horizontal boundary of the display.

13. A terminal according to claim 12 wherein:
the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

14. A terminal according to claim 9, wherein the wrapped length element is arranged to split the element into parts, each of the parts fitting in the size of the display and to feed said parts in a vertical direction over said display, each time a length of the wrapped length element is greater than a width of the display.

15. A terminal according to claim 14 wherein:
the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

16. A terminal according to claim 9 wherein:
the display displays the displayed menu structure provided by the interface and the user selects from the display of the menu structure to have a display of one of the continuous length item and the wrapped length item by providing an input choosing one of the display options through the display menu structure indicating the selection of the one of the continuous length item and the wrapped length item.

17. A mobile phone terminal for displaying information via a browser, said information comprising elements, wherein an element is one of a continuous length element and a wrapped length element, said terminal comprising:
a display for displaying said information and a display menu structure of items displayed on said display;
means for selecting a first type of elements to be displayed as a continuous length item and a second type of elements to be displayed as a wrapped length item which are chosen from the display as display options of the displayed menu structure; and
means for displaying the first and second type of elements according to selection as a display option of the menu structure,
wherein selection of the continuous length item causes the element to be displayed as the continuous length element on a single line of the display and selection of the wrapped length item causes the wrapped length element to be displayed on a plurality of lines of the display, the continuous length element presenting a length which is equal to or greater than a horizontal size of the display, and the wrapped length element presenting a horizontal length which is less than the horizontal size of the display.

18. A terminal in accordance with claim 17 wherein:
the display displays the displayed menu structure provided by the interface and a user selects from the display of the menu structure to have a display of one of the continuous length item and the wrapped length item by providing an input choosing one of the display options through the display menu structure indicating the selection of the one of the continuous length item and the wrapped length item.

19. A computer program product for displaying information on a mobile terminal display via a browser, the information including elements, wherein an element is one of a continuous length element presenting a length which is equal to or greater than a horizontal size of the mobile terminal display, and a wrapped length element presenting a horizontal length which is less than the horizontal size of the mobile terminal display, and the mobile terminal display is further provided with a user interface including a displayed menu structure of items displayed on the mobile terminal display, the computer program product comprising at least one computer-readable storage medium having computer-readable program code portions stored therein, the computer-readable program code portions comprising:
a first executable portion for providing in the displayed menu structure a selectable continuous length item and a wrapped length item which are chosen from the mobile terminal display as display options;
a second executable portion for selecting one of the continuous length item and the wrapped length item in the displayed menu structure of the user interface; and a third executable portion for displaying the information according to the selection of the display option made in the menu structure of the user interface, in order to allow a user to toggle between the continuous length item and the wrapped length item, wherein selection of the continuous length item causes the element to be displayed as the continuous length element on a single line of the mobile terminal display and selection of the wrapped length item causes the wrapped length element to be displayed on a plurality of lines of the mobile terminal display.

20. A computer program product according to claim 19, wherein the third executable portion is further adapted to arranging the continuous length element to be horizontally scrolled over the mobile terminal display to allow the user to view portions of the continuous length element that are not visible on the mobile terminal display due to the continuous length element extending beyond a horizontal boundary of the mobile terminal display.

21. A computer program product according to claim 19, wherein the third executable portion is further adapted to fitting the wrapped length element to a size of the mobile terminal display by splitting the wrapped length element into parts, each of the parts fitting in a size of the mobile terminal display and feeding the parts in a vertical direction over the mobile terminal display, each time a length of the wrapped length element is greater than the width of the mobile terminal display.

* * * * *